US009198072B2

(12) United States Patent
Gomadam

(10) Patent No.: US 9,198,072 B2
(45) Date of Patent: Nov. 24, 2015

(54) CALCULATING AND REPORTING CHANNEL CHARACTERISTICS

(71) Applicant: MARVELL WORLD TRADE LTD., St. Michael (BB)

(72) Inventor: Krishna Srikanth Gomadam, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 159 days.

(21) Appl. No.: 13/897,144

(22) Filed: May 17, 2013

(65) Prior Publication Data

US 2014/0003266 A1    Jan. 2, 2014

Related U.S. Application Data

(60) Provisional application No. 61/648,173, filed on May 17, 2012.

(51) Int. Cl.
| | |
|---|---|
| *G01R 31/08* | (2006.01) |
| *H04W 24/10* | (2009.01) |
| *H04B 7/02* | (2006.01) |
| *H04L 1/00* | (2006.01) |
| *H04B 7/06* | (2006.01) |
| *H04L 1/20* | (2006.01) |

(52) U.S. Cl.
CPC .............. *H04W 24/10* (2013.01); *H04B 7/024* (2013.01); *H04B 7/0632* (2013.01); *H04L 1/0026* (2013.01); *H04L 1/20* (2013.01)

(58) Field of Classification Search
CPC .................................................... H04W 24/10
USPC ........... 370/252–253, 328–339; 375/227–260
See application file for complete search history.

(56) References Cited

U.S. PATENT DOCUMENTS

| | | | |
|---|---|---|---|
| 8,391,392 B2 | 3/2013 | Melzer et al. | |
| 2007/0213057 A1* | 9/2007 | Shaheen | 455/436 |
| 2010/0271968 A1* | 10/2010 | Liu et al. | 370/252 |
| 2012/0087435 A1 | 4/2012 | Gomadam et al. | |

(Continued)

FOREIGN PATENT DOCUMENTS

| | | |
|---|---|---|
| WO | WO-2012/096394 | 7/2012 |
| WO | WO-2012/162576 A1 | 11/2012 |

OTHER PUBLICATIONS

International Search Report and Written Opinion in corresponding PCT/US2013/041662 mailed Sep. 6, 2013.

(Continued)

*Primary Examiner* — Iqbal Zaidi

(57) ABSTRACT

An interference covariance calculation technique is selected at a first communication device, where the interference covariance calculation technique is to be utilized by a second communication device when computing a channel quality indicator (CQI) associated with a communication channel between the first communication device and the second communication device. The interference covariance calculation technique is selected from a set of multiple techniques for calculating interference covariance. The first communication device transmits an indication of the selected interference covariance calculation technique to the second communication device. The first communication device receives a CQI calculated by the second communication device in accordance with the selected interference covariance calculation technique.

21 Claims, 7 Drawing Sheets

(56) References Cited

U.S. PATENT DOCUMENTS

2012/0113917 A1   5/2012   Gaal et al.
2012/0208547 A1   8/2012   Geirhofer et al.
2013/0059596 A1   3/2013   Gomadam et al.
2013/0156001 A1   6/2013   Gomadam

OTHER PUBLICATIONS

3GPP TSG RAN WGI Meeting #57bis R1-092654 CoMP Implicit CQI Feedback Discussion, Los Angeles, CA Jun. 29-Jul. 3, 2009, 7 pgs.
3GPP TSG RAN WG1 Meeting #56 BIS,CATT, Analysis of Feebback Signalling for Downlink CoMP Discussion, Korea, Mar. 23-27, 2009, 3 pages.
"Technical White Paper: Long Term Evolution (LTE): A Technical Overview", Motorola, 2007, 15 pages.
3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)", Dec. 2011, 101 pages.
3GPP TS 36.213 V10.5.0, 3rd Generation Partnership Project; Technical Specification Group Radio Access Network; Evolved Universal Terrestrial Radio Access (E-UTRA); Physical Layer Procedures (Release 10), Mar. 2012, 125 pages.
3GPP TS 36.300 V11.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Mar. 2012, 194 pages.
3GPP TS 36.304 V9.5.0, "3rd Generation Partnership Project; Technical Specification Group Radio Access Network; Evolved Universal Terrestrial Radio Access (E-UTRA); User Equipment (UE) procedures in idle mode (Release 9)", Dec. 2010, 32 pages.
3GPP TS 23.122 V9.5.0, "3rd Generation Partnership Project; Technical Specification Group Core Network and Terminals; Non-Access-Stratum (NAS) functions related to Mobile Station (MS) in idle mode (Release 9)", Dec. 2010, 42 pages.
3GPP TS 24.301 V9.5.0, "3rd Generation Partnership Project; Technical Specification Group Core Network and Terminals; Non-Access-Stratum (NAS) for Evolved Packet System (EPS); Stage 3 (Release 9)", Dec. 2010, 297 pages.
3GPP TS 36.331 V10.4.0, "3rd Generation Partnership Project; Technical Specification Group Radio Access Network; Evolved Universal Terrestrial Radio Access (E-UTRA); Radio Resource Control (RRC); Protocol Specification (Release 10)", Dec. 2011, 296 pages.
3GPP TS 23.203 V10.6.0, "3rd Generation Partnership Project; Technical Specification Group Services and System Aspects; Policy and Charging Control Architecture (Release 10)", Mar. 2012, 131 pages.
Yuan et al., "Carrier Aggregation for LTE-Advanced Mobile Communication Systems," IEEE Communications Magazine, pp. 88-93, Feb. 2010.
Wannstrom, "Carrier Aggregation explained," pp. 1-6 May 2012.
Pedersen et al., "Carrier Aggregation for LTE-Advanced: Functionality and Performance Aspects," IEEE Communications Magazine, vol. 49, No. 6, pp. 89-95, Jun. 1, 2011.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).
IEEE Std 802.11$^{TM}$ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
IEEE Std 802.11ac/D5.0 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).
IEEE P802.16Rev2/D5 (Jul. 2008) (Revision of IEEE Std 802.16-2004 and consolidates material from IEEE Std 802.16e-2005, Std 802.16/2004/Cor1-2005, Std 802.16f-2005 and Std 802.16g-2007) "Draft Standard for Local and metropolitan area networks: Part 16: Air Interface for Broadband Wireless Access Systems," *The Institute of Electrical and Electronics Engineers, Inc.*, pp. 1-1970 (Jun. 2008).
IEEE Std 802.16-2009 (Revision of IEEE Std. 802.16-2004), IEEE Standard for Local and metropolitan area networks: Part 16: Air Interface for Broadband Wireless Access Systems, *The Institute of Electrical and Electronics Engineers, Inc.*, 2082 pages (May 29, 2009).
IEEE Std 802.16m$^{™}$-2011, "IEEE Standard for Local and metropolitan area networks: Part 16: Air Interface for Broadband Wireless Access Systems: Amendment 3: Advanced Air Interface," *The Institute of Electrical and Electronics Engineers, Inc.*, 554 pages. (May 6, 2011).
IEEE Std 802.16j (Amendment to IEEE Std 802.16-2009), "IEEE Standard for Local and metropolitan area networks: Part 16: Air Interface for Broadband Wireless Access Systems-Amendment 1: Multihop Relay Specification," *The Institute of Electrical and Electronics Engineers, Inc.*, pp. 1-315 (Jun. 12, 2009).
IEEE 802.20-PD-06; IEEE P 802.20TMV14, Draft 802.20 Permanent Document; <System Requirements for IEEE 802.20 Mobile Broadband Wireless Access Systems—Version 14>, 24 pages (Jul. 16, 2004).
Chen, "Home Network Basis: Transmission Environments and Wired/Wireless Protocols," *Prentice Hall*, pp. 1-26 (Jul. 2003).
Gomadam, et al., U.S. Appl. No. 13/733,150, "Reference Signal Design for Interference Measurement," filed Jan. 3, 2013.
Hiertz, et al., "The IEEE 802.11 Universe," *IEEE Communications Magazine*, pp. 62-70, (Jan. 2010).
International Preliminary Report on Patentability in International Application No. PCT/US2013/041662, dated Nov. 27, 2014 (12 pages).

* cited by examiner

CALCULATING AND REPORTING CHANNEL CHARACTERISTICS

CROSS-REFERENCES TO RELATED APPLICATIONS

This disclosure claims the benefit of U.S. Provisional Patent Application No. 61/648,173, entitled "CQI Calculation Methods for CoMP," filed on May 17, 2012, which is incorporated herein by reference in its entirety.

FIELD OF THE DISCLOSURE

The present disclosure relates generally to wireless communications, and more particularly, to measuring characteristics of a wireless communication channel.

BACKGROUND

Some Multiple-Input Multiple-Output (MIMO) communication systems use cooperative transmission schemes, in which multiple base stations coordinate beamforming and precoding decisions with one another. Coordinated transmission is also referred to as coordinated beamforming or Coordinated Multipoint (CoMP). Coordinated transmission is considered, for example, for Evolved Universal Terrestrial Radio Access (E-UTRA) systems, also referred to as Long-Term Evolution (LTE), which are specified by the Third Generation Partnership Project (3GPP). Cooperative beamforming for LTE is described, for example, in document R1-093488 of the 3GPP Technical Specification Group (TSG) Radio Access Network (RAN), entitled "LTE Spectral Efficiency and IMT-Advanced Requirements," Shenzhen, China, Aug. 24-28, 2009, which is incorporated herein by reference.

Coordinated transmission schemes often use feedback regarding the communication channels, which is fed back from the mobile terminals to the base stations. An example feedback scheme for coordinated transmission is described in 3GPP TSG RAN document R1-092634, entitled "CoMP Operation Based on Spatial Covariance Feedback and Performance Results of Coordinated SU/MU Beamforming," Los Angeles, Calif., Jun. 29-Jul. 3, 2009, which is incorporated herein by reference.

3GPP TSG RAN document R1-093474, entitled "Coordinated Beamforming with DL MU-MIMO," Shenzhen, China, Aug. 24-28, 2009, which is incorporated herein by reference, describes a Multi-User MIMO (MU-MIMO) scheme with coordinated beamforming, which is based on a long-term wideband transmit covariance matrix.

CoMP schemes are also considered for LTE-Advanced (LTE-A) systems. Example CoMP schemes for LTE-A, with reference to feedback, are described in 3GPP TSG RAN document R1-093833, entitled "System Performance Comparisons of Several DL CoMP schemes," Miyazaki, Japan, Oct. 12-16, 2009, which is incorporated herein by reference. 3GPP TSG RAN document R1-093132, entitled "DL performance of LTE-A: FDD," Shenzhen, China, Aug. 24-28, 2009, which is incorporated herein by reference, describes LTE-A MU-MIMO schemes with CoMP using Frequency Division Duplexing (FDD). 3GPP TSG RAN document R1-093109, entitled "Feedback in Support of DL CoMP: General Views," Shenzhen, China, Aug. 24-28, 2009, which is incorporated herein by reference, discusses several feedback design options for implementing CoMP in LTE-A systems.

SUMMARY

In one embodiment, a method includes selecting, at a first communication device, an interference covariance calculation technique to be utilized by a second communication device when computing a channel quality indicator (CQI) associated with a communication channel between the first communication device and the second communication device, wherein the interference covariance calculation technique is selected from a set of multiple techniques for calculating interference covariance; transmitting, with the first communication device, an indication of the selected interference covariance calculation technique to the second communication device; and receiving, at a first communication device, a CQI calculated by the second communication device in accordance with the selected interference covariance calculation technique.

In other embodiments, the method includes any combination of one or more of the following features.

Selecting the interference covariance calculation technique comprises selecting, at the first communication device, an equation that is to be utilized by the second communication device when calculating interference covariance, the equation selected from a set of multiple equations.

The set of multiple equations includes a first equation that corresponds to no transmitters in a cluster being considered as interferers, and a second equation that corresponds to a set of one or more transmitters in the cluster being considered as interferers.

Selecting the interference covariance calculation technique comprises selecting, at the first communication device, a set of one or more transmitters that are to be considered interferers when calculating interference covariance.

The method further comprises selecting, at the first communication device, a CQI calculation technique to be utilized by the second communication device when computing the CQI associated with the communication channel between the first communication device and the second communication device, wherein the CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters; and transmitting, with the first communication device, an indication of the selected CQI calculation technique to the second communication device, wherein the received CQI calculated by the second communication device is in accordance with the selected CQI calculation technique.

In another embodiment, a first communication device comprises a network interface device. The network interface device is configured to select an interference covariance calculation technique to be utilized by a second communication device when computing a channel quality indicator (CQI) associated with a communication channel between the first communication device and the second communication device, wherein the interference covariance calculation technique is selected from a set of multiple techniques for calculating interference covariance, cause the first communication device to transmit an indication of the selected interference covariance calculation technique to the second communication device, and process a CQI received from the second communication device in response to the transmitted indication of the selected interference covariance calculation device, the CQI having been calculated by the second communication device in accordance with the selected interference covariance calculation technique.

In other embodiments, the first communication device comprises any combination of one or more of the following features.

The network interface device is configured to select interference covariance calculation technique at least by selecting an equation that is to be utilized by the second communication device when calculating interference covariance, the equation selected from a set of multiple equations.

The set of multiple equations includes a first equation that corresponds to no transmitters in a cluster being considered as interferers, and a second equation that corresponds to a set of one or more transmitters in the cluster being considered as interferers.

The network interface device is configured to select interference covariance calculation technique at least by selecting a set of one or more transmitters that are to be considered interferers when calculating interference covariance.

The network interface device is configured to select, a CQI calculation technique to be utilized by the second communication device when computing the CQI associated with the communication channel between the first communication device and the second communication device, wherein the CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters, and cause the first communication device to transmit an indication of the selected CQI calculation technique to the second communication device, wherein the received CQI calculated by the second communication device is in accordance with the selected CQI calculation technique.

In another embodiment, a method includes calculating, at a first communication device, a plurality of interference covariances according to a plurality of interference covariance calculation techniques, the plurality of interference covariances associated with a communication channel between the first communication device and a second communication device; selecting, at the first communication device, a subset of one or more interference covariances in the plurality of interference covariances; calculating, at the first communication device, a set of one or more respective channel quality indicators (CQIs) using the subset of one or more interference covariances; transmitting, from the first communication device to the second communication device, the set of one or more CQIs; and transmitting, from the first communication device to the second communication device, a set of one or more indicators of one or more respective interference covariance calculation techniques utilized to calculate the set of one or more CQIs.

In other embodiments, the method includes any combination of one or more of the following features.

The plurality of interference covariance calculation techniques comprises a first interference covariance calculation technique that utilizes a first equation that corresponds to no transmitters in a cluster being considered as interferers, and a second interference covariance calculation technique that utilizes a second equation that corresponds to a set of one or more transmitters in the cluster being considered as interferers.

The plurality of interference covariance calculation techniques comprises a first interference covariance calculation technique that considers a third communication device as an interferer; and a second interference covariance calculation technique that does not consider the third communication device as an interferer.

Calculating the set of one or more respective CQIs using the subset of one or more interference covariances comprises calculating the set of one or more CQIs according to a selected CQI calculation technique, wherein the selected CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters.

The method further comprises transmitting, from the first communication device to the second communication device, an indication of the selected CQI calculation technique.

Selecting the subset of one or more interference covariances in the plurality of interference covariances comprises selecting one or more interference covariances that correspond to one or more respective interference hypotheses that result in higher spectral efficiency as compared to other interference hypotheses corresponding to other interference covariances.

In another embodiment, a first communication device comprises a network interface device. The network interface device is configured to calculate a plurality of interference covariances according to a plurality of interference covariance calculation techniques, the plurality of interference covariances associated with a communication channel between the first communication device and a second communication device, select a subset of one or more interference covariances in the plurality of interference covariances, calculate a set of one or more respective channel quality indicators (CQIs) using the subset of one or more interference covariances, cause the first communication device to transmit the set of one or more CQIs to the second communication device, and cause the first communication device to transmit a set of one or more indicators of one or more respective interference covariance calculation techniques utilized to calculate the set of one or more CQIs to the second communication device.

In other embodiments, the first communication device comprises any combination of one or more of the following features.

The plurality of interference covariance calculation techniques comprises a first interference covariance calculation technique that utilizes a first equation that corresponds to no transmitters in a cluster being considered as interferers; and a second interference covariance calculation technique that utilizes a second equation that corresponds to a set of one or more transmitters in the cluster being considered as interferers.

The plurality of interference covariance calculation techniques comprises a first interference covariance calculation technique that considers a third communication device as an interferer; and a second interference covariance calculation technique that does not consider the third communication device as an interferer.

The network interface is configured to calculate the set of one or more respective CQIs at least by calculating the set of one or more CQIs according to a selected CQI calculation technique, wherein the selected CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters, and cause the first communication device to transmit an indication of the selected CQI calculation technique to the second communication device.

The network interface device is configured to select the subset of one or more interference covariances in the plurality of interference covariances at least by selecting one or more interference covariances that correspond to one or more respective interference hypotheses that result in higher spectral efficiency as compared to other interference hypotheses corresponding to other interference covariances.

The network interface device is configured to select the subset of one or more interference covariances in the plurality of interference covariances at least by selecting an interference covariance that correspond to a maximum spectral efficiency as compared to other interference hypotheses corresponding to other interference covariances.

In another embodiment, a method includes receiving, at a first communication device, an indication of a selected interference covariance calculation technique from a second communication device, the selected interference covariance calculation technique having been selected by the second communication device from a set of multiple techniques for calculating interference covariance; determining, at the first communication device, which interference covariance calculation technique from the set of multiple techniques for calculating interference covariance to use when calculating an interference covariance based on the received indication, the interference covariance associated with a communication channel between the first communication device and the second communication device; calculating, at the first communication device, the interference covariance using the determined interference covariance calculation technique; calculating, at the first communication device, a channel quality indicator (CQI) using the calculated interference covariance, the CQI associated with the communication channel between the first communication device and the second communication device; and transmitting, with the first communication device, the CQI to the second communication device.

In other embodiments, the method includes any combination of one or more of the following features.

Determining which interference covariance calculation technique to use comprises determining, at the first communication device, an equation that is to be utilized based on the received indication, the equation from a set of multiple alternative equations.

The set of multiple alternative equations includes: a first equation that corresponds to no transmitters in a cluster being considered as interferers, and a second equation that corresponds to a set of one or more transmitters in the cluster being considered as interferers.

Determining which interference covariance calculation technique to use comprises: determining, at the first communication device, a set of one or more transmitters that are to be considered interferers when calculating interference covariance.

The method further comprises receiving, with the first communication device, an indication of a selected CQI calculation technique to be utilized by the first communication device when computing the CQI, the CQI calculation technique having been selected by the second communication device from a set of multiple techniques for CQI including (i) a first CQI calculation technique associated with calculating CQI for a single transmitter, and (ii) a second CQI calculation technique associated with calculating an aggregated CQI for multiple transmitters, wherein calculating the CQI comprises calculating the CQI using the selected CQI calculation technique.

In another embodiment, a first communication device comprises a network interface device. The network interface device is configured to determine which interference covariance calculation technique from a set of multiple techniques for calculating interference covariance to use when calculating an interference covariance based on an indication of a selected interference covariance calculation technique received from a second communication device, the selected interference covariance calculation technique having been selected by the second communication device from a set of multiple techniques for calculating interference covariance, the interference covariance associated with a communication channel between the first communication device and the second communication device, calculate the interference covariance using the determined interference covariance calculation technique, calculate a channel quality indicator (CQI) using the calculated interference covariance, the CQI associated with the communication channel between the first communication device and the second communication device, and cause the first communication device to transmit the CQI to the second communication device.

In other embodiments, the first communication device comprises any combination of one or more of the following features.

The network interface device is configured to determine which interference covariance calculation technique to use at least by determining an equation that is to be utilized based on the received indication, the equation from a set of multiple alternative equations.

The set of multiple equations includes: a first equation that corresponds to no transmitters in a cluster being considered as interferers; and a second equation that corresponds to a set of one or more transmitters in the cluster being considered as interferers.

The network interface device is configured to determine which interference covariance calculation technique to use at least by determining a set of one or more transmitters that are to be considered interferers when calculating interference covariance.

The network interface device is configured to determine a CQI calculation technique to use based on a received indication of a selected CQI calculation technique, the selected CQI calculation technique having been selected by the second communication device from a set of multiple techniques for CQI calculation including (i) a first CQI calculation technique associated with calculating CQI for a single transmitter, and (ii) a second CQI calculation technique associated with calculating an aggregated CQI for multiple transmitters, calculate the CQI using the determined CQI calculation technique.

In another embodiment, a method includes receiving, at a first communication device, a channel quality indicator (CQI) transmitted from a second communication device, the CQI having been calculated by the second communication device, wherein the CQI is associated with a communication channel between the first communication device and the second communication device; receiving, at the first communication device, an indication of an interference covariance calculation technique transmitted from the second communication device, the interference covariance calculation technique having been utilized by the second communication device to compute the CQI; determining, at the first communication device, which interference covariance calculation technique, from a plurality of alternative interference covariance calculation techniques, was utilized by the second communication device based on the received indication of the interference covariance calculation technique; and processing, at the first communication device, the CQI based on the determination of the interference covariance calculation technique utilized by the second communication device.

In other embodiments, the method includes any combination of one or more of the following features.

Determining which interference covariance calculation technique was utilized comprises determining which equation, from a set of multiple alternative equations, was utilized by the second communication device.

The set of multiple alternative equations includes: a first equation that corresponds to no transmitters in a cluster being considered as interferers, and a second equation that corresponds to a set of one or more transmitters in the cluster being considered as interferers.

Determining which interference covariance calculation technique was utilized comprises determining, at the first communication device, a set of one or more transmitters that are to be considered interferers when calculating interference covariance.

In another embodiment, a first communication device comprises a network interface device. The network interface device is configured to receive a channel quality indicator (CQI) transmitted from a second communication device, the CQI having been calculated by the second communication device, wherein the CQI is associated with a communication channel between the first communication device and the second communication device, receive an indication of an interference covariance calculation technique transmitted from the second communication device, the interference covariance calculation technique having been utilized by the second communication device to compute the CQI, determine which interference covariance calculation technique, from a plurality of alternative interference covariance calculation techniques, was utilized by the second communication device based on the received indication of the interference covariance calculation technique, and process the CQI based on the determination of the interference covariance calculation technique utilized by the second communication device.

In other embodiments, the first communication device any combination of one or more of the following features.

The network interface device is configured to determine which interference covariance calculation technique was utilized at least by determining which equation, from a set of multiple alternative equations, was utilized by the second communication device.

The set of multiple alternative equations includes: a first equation that corresponds to no transmitters in a cluster being considered as interferers; and a second equation that corresponds to a set of one or more transmitters in the cluster being considered as interferers.

The network interface device is configured to determine which interference covariance calculation technique was utilized at least by determining a set of one or more transmitters that are to be considered interferers when calculating interference covariance.

DETAILED DESCRIPTION

In embodiments described below, a first wireless communication device such as an evolved node base device (eNB) of a communication network transmits to and receives from a second wireless communication device, such as a user equipment device (UE). eNB and UE correspond to terminology used in the $3^{rd}$ Generation Partnership Project Long Term Evolution (3GPP LTE) Standard. The apparatus and methods discussed herein, however, are not limited to 3GPP LTE networks. Rather, the apparatus and methods discussed herein may be utilized in other types of wireless communication networks as well. For instance, another example system that may utilize embodiments of apparatus and methods described herein is a technology promulgated by the Worldwide Interoperability for Microwave Access (WiMAX) Forum (such systems conform to the Institute for Electrical and Electronics Engineers (IEEE) 802.16e Standard). In WiMAX, a base station (BS) corresponds to the eNB of 3GPP LTE, and a mobile station (MS) corresponds to the UE. In other embodiments, other types of systems may utilize apparatus and methods described herein such as communication systems that conform to one or more of the IEEE 802.16 Standards, wireless local area network (WLAN) systems such as systems that conform to one or more of IEEE 802.11 Standards, etc. For ease of explanation, however, the description below refers to base stations (e.g., eNBs) and client stations (e.g., UEs).

Figure 1A:
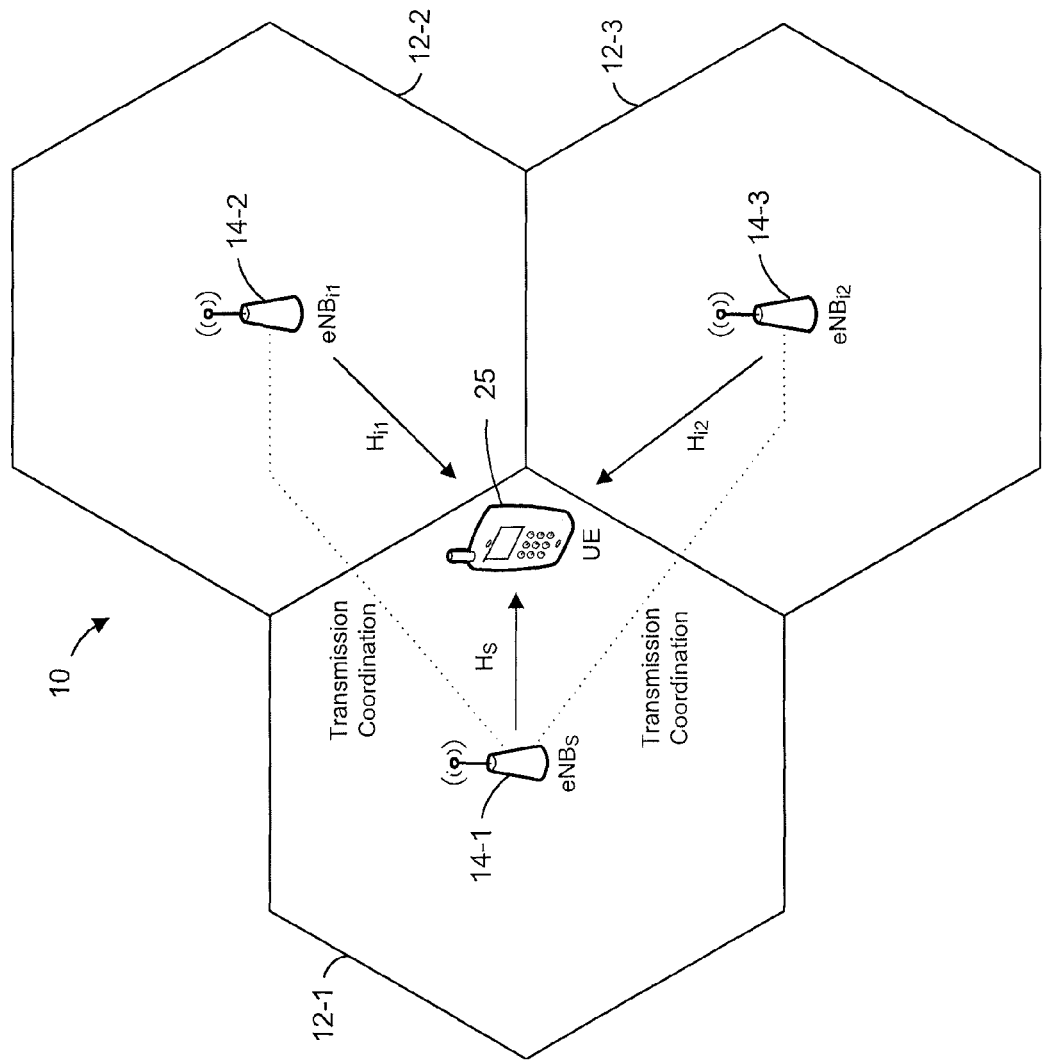
FIG. 1A is a block diagram of an example system in which a client station calculates a channel quality indicator (CQI) which is then used by base stations to perform coordination transmission, according to an embodiment.

FIG. 1A is a block diagram of an example wireless communication network 10, according to an embodiment. The network 10 includes a plurality of cells 12 served by respective base stations 14. For example, the base station 14-1 serves the cell 12-1; the base station 14-2 serves the cell 12-2; and the base station 14-3 serves the cell 12-3. Although three cells 12 and three base stations 14 are illustrated for clarity, typical system include many more cells 12 and base stations 14.

As discussed in more detail below, base stations 14 corresponding to adjacent cells 12 may coordinate transmissions to client stations, particularly near an edge of a cell 12 to improve reception by the client station. For example, a client station 25 is within cell 12-1, but is located near an edge of the cell 12-1 and near cells 12-2 and 12-3. Base stations 14-1, 14-2, and 14-3 coordinate transmissions to the client station 25 to improve reception by the client station 25, in an embodiment.

In an embodiment, base stations 14 use a coordinated transmission scheme in which the base stations 14 coordinate downlink transmissions, and in particular coordinate downlink scheduling and/or beamforming. For example, in a coherent Joint Processing (JP) mode of operation, two or more base stations 14 simultaneously transmit data to the client station 25 to coherently or non-coherently improve reception by the client station 25, in an embodiment. For instance, the base stations 14-1, 14-2, and 14-3, when operating in JP mode, simultaneously transmit the same data to the client station 25, in an embodiment. As another example, in a Coordinated Beamforming (CB) mode of operation, the base stations 14 coordinate their respective downlink transmissions so that interfering base stations 14 refrain from transmitting to a given client station at a given time and/or at a given frequency in order to reduce interference. For example, in CB mode, the base stations 14-2 and 14-3 refrain from transmitting at a given time and/or a given frequency to reduce interference of a transmission, at the given time and/or the given frequency, from the base station 14-1 to the client station 25, in an embodiment. As another example, in a dynamic point selection (DPS) mode of operation, one or more base stations 14 are dynamically selected for transmitting to the client station 25 at a given time and/or a given frequency.

To enable such coordination between the base stations 14, one or more of the base stations 14 require information regarding channel conditions between each base station 14 and the client station 25, in an embodiment. For example, an estimate $H_S$ of a channel from the base station 14-1 to the client station 25 is needed; an estimate $H_{i1}$ of a channel from the base station 14-2 to the client station 25 is needed; and an estimate $H_{i2}$ of a channel from the base station 14-1 to the client station 25 is needed, in some embodiments. In an embodiment, the client station 25 processes a respective known signal from each base station 14 and calculates a respective channel measurement based on the processing of the respective known signal. Each channel measurement is then transmitted to one or more of the base stations 14, in an embodiment.

As another example, a measurement of noise in the channel from the base station 14-1 to the client station 25 is needed; a measurement of noise in the channel from the base station 14-2 to the client station 25 is needed; and a measurement of noise in the channel from the base station 14-1 to the client station 25 is needed, in some embodiments. Noise measurements corresponding to the different channels (e.g., from each base station 14 to the client station 25) are then transmitted to one or more of the base stations 14, in an embodiment.

In some embodiments, the system 10 utilizes orthogonal frequency division multiplexing (OFDM). In some embodiments, a transmission from the base station 14-1 to the client station 25, for example, is scheduled for one or more particular resource elements, where each resource element corresponds to a particular OFDM symbol and a particular frequency subcarrier within the OFDM symbol. Thus, in some embodiments, coordination among the base stations 14 may require knowledge of channel conditions at one or more particular resource elements. In some embodiments, there may be tens or even hundreds of subcarriers, and hundreds of OFDM symbols within one downlink frame.

In some embodiments, channel state information (CSI) is measured at the client station 25 at one or more particular resource elements (REs), and then the client station 25 reports the CSI to one or more base stations 14 as CSI feedback. In an embodiment, CSI feedback includes channel measurement and interference measurement. In some embodiments channel measurement and interference measurement are accomplished, at least in part, using references signals transmitted by one or more of the base stations 14, such references signals sometimes referred to as Channel State Information Reference Signals (CSI-RS). A CSI-RS includes pilot transmissions with non-zero power that are received by the client station 25 and used by the client station 25 to measure channel and/or interference conditions, in an embodiment. In some embodiments, interference measurement is accomplished, at least in part, by one or more base stations 14 muting transmissions in a particular RE, and the client station 25 making measurements in that RE, the measurements indicative of a level of potential interference.

For example, in an embodiment, base station 14-1 transmits CSI-RS in a first RE while base stations 14-2 and 14-3 are muted; base station 14-2 transmits CSI-RS in a second RE while base stations 14-1 and 14-3 are muted; base station 14-3 transmits CSI-RS in a third RE while base stations 14-1 and 14-2 are muted; and all of base stations 14-1, 14-2, and 14-3 remain muted in a fourth RE. In this example, the client station 15 can utilize the first RE to measure $H_S$; the client station 15 can utilize the second RE to measure $H_{i1}$; and the client station 15 can utilize the second RE to measure $H_{i2}$. There may be, however, multiple ways to measure interference depending on the particular transmission scheme that will be employed. For example, if base stations 14-1 and 14-2 will be joint transmitters and base station 14-3 will be considered an interferer, then interference would be measured using the third RE, in an embodiment. On the other hand, if base stations 14-1 and 14-3 will be joint transmitters and base station 14-2 will be considered an interferer, then interference would be measured using the second RE, in an embodiment. As yet another example, if all of base stations 14-1, 14-2, and 14-3 will be joint transmitters, then neither the second RE nor the third RE would be used to measure interference, in an embodiment.

Similarly, a first interference calculation technique is utilized if JP is to be utilized, whereas a second interference calculation technique is utilized if DPS is to be utilized, in an embodiment. Thus, there may be multiple ways for the client station 25 to generate a measure of interference depending upon, for example, which base stations 14 are considered interferers and/or which type of transmission scheme is to be employed (e.g., JP, CP, DPS, etc.), in some embodiments.

In some embodiments, the client station 25 reports to one or more base stations 14 an indicator of channel quality, such as a channel quality indicator (CQI). In some embodiments, CQI includes an indication of interference. As discussed above, there may be multiple ways for the client station 25 to generate a measure of interference depending upon, for example, which base stations 14 are considered interferers and/or which type of transmission scheme is to be employed (e.g., JP, CP, DPS, etc.), in some embodiments. Thus, there may be multiple ways for the client station 25 to generate CQI depending upon, for example, which base stations 14 are considered interferers and/or which type of transmission scheme is to be employed (e.g., JP, CP, DPS, etc.), in some embodiments.

In some embodiments described below, one or more of the base stations 14 transmit to the client station 25 an indication of a method for generating a channel quality indicator (CQI) is to be generated. The client station 25 then generates CQI in accordance with the indicated method, and feeds back the generated CQI to one or more base stations 14. In this embodiment, the one or more base stations 14 know that the CQI fed back from the client station 25 was generated according to the indicated method.

In some embodiments described below, the client station 25 calculates interference covariance for multiple different interference scenarios, and determines a set of one or more best interference covariance scenarios. For example, in an embodiment, the one or more best interference covariance scenarios correspond to a set of one or more interference hypotheses that result in higher spectral efficiency as compared to other interference hypotheses. As an example, a first interference hypothesis in the system 10 is that the base station 14-1 transmits a desired signal while base stations 14-2 and 14-3 are interferers; a second interference hypothesis in the system 10 is that the base stations 14-1 and 14-2 jointly transmit desired signals while the base station 14-3 is an interferer; a third interference hypothesis in the system 10 is that the base stations 14-1 and 14-3 jointly transmit desired signals while the base station 14-2 is an interferer; etc. The client station 25 feeds back a set of one or more CQIs corresponding to the set of one or more best interference covariance scenarios along with a set of one or more indicators of the one or more best interference covariance scenarios. In an embodiment, one interference covariance scenario is selected, where the one selected interference scenario corresponds to an interference hypothesis that results in maximum spectral efficiency as compared to other interference hypotheses. In an embodiment, the client station 25 feeds back one CQI corresponding to the one interference covariance scenario that maximizes spectral efficiency.

In an embodiment, the system 10 operates in accordance with the 3GPP Long-Term Evolution Advanced (LTE-A) specifications. In other embodiments, however, the system 10 operates in accordance with any other suitable communication standard or protocol. For example, the disclosed techniques can also be applied in Wi-Fi systems operating in accordance with one or more of the IEEE 802.11 specifications or in WiMAX systems operating in accordance with the IEEE 802.16m specifications.

Figure 1B:
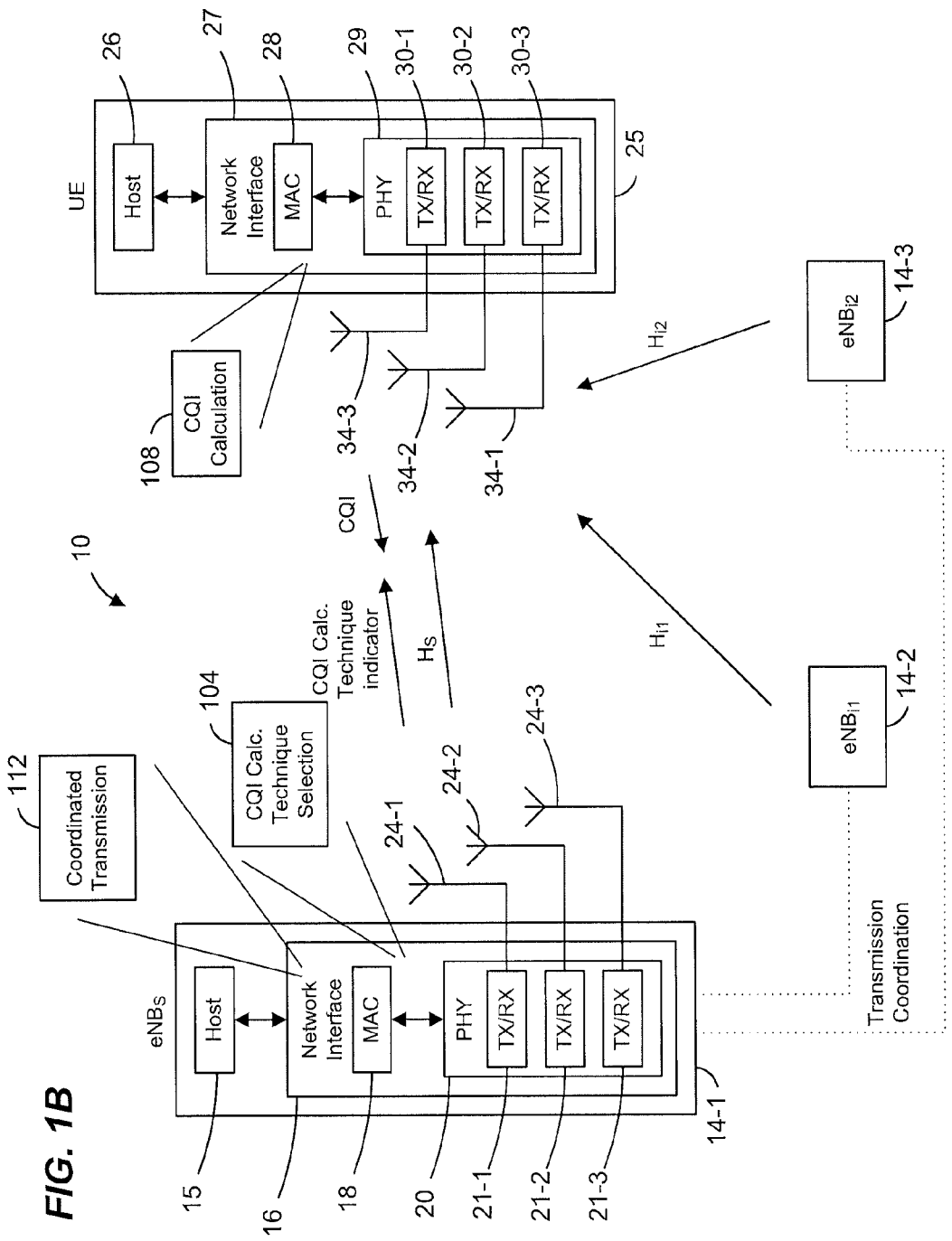
FIG. 1B is a block diagram of another example system in which a client station calculates a CQI which is then used by base stations to perform coordination transmission, according to an embodiment.

FIG. 1B is another block diagram of the example wireless communication network 10, according to an embodiment. The base station 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1B, the bases station 14 can include different suitable numbers (e.g., 2, 4, 5, etc.) of transceivers 21 and antennas 24 in other embodiments. In some embodiments, multiple transceivers 21 are coupled to the same antenna and antenna selection is utilized. Thus, in some embodiments, the number of antennas 24 is not the same as the number of transceivers 21. Additionally, in some embodiments, the base station 14 is configured to utilize antenna diversity, antenna beamforming, and/or a multiple input, multiple output (MIMO) technique such as spatial multiplexing.

In various embodiments, one or both of the base stations 14-2 and 14-3 have a structure the same as or similar to the base station 14-1.

The client station, UE 25, includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1B, the client station 25 can include different numbers (e.g., 2, 4, 5, etc.) of transceivers 30 and antennas 34 in other embodiments. In some embodiments, multiple transceivers 30 are coupled to the same antenna and antenna selection is utilized. Thus, in some embodiments, the number of antennas 34 is not the same as the number of transceivers 30. Additionally, in some embodiments, the client station 25 is configured to utilize antenna diversity, antenna beamforming, and/or a multiple input, multiple output (MIMO) technique such as spatial multiplexing.

In some embodiments, the network interface 16 of the base station 14-1 is configured to cause the base station 14-1 to transmit to the client station 25 an indication of a method for generating a channel quality indicator (CQI). The network interface 27 of the client station 25 is configured to then generate CQI in accordance with the indicated method, and cause the client station 25 to transmit the generated CQI to the base station 14-1. In this embodiment, the network interface 16 of the base station 14 knows that the CQI fed back from the client station 25 was generated according to the indicated method.

In an embodiment, the network interface 16 of the base station 14-1 includes a CQI calculation technique selection module 104 configured to select a subset of one or more techniques for calculating CQI from a plurality of alternative techniques for calculating CQI. Additionally, the CQI calculation technique selection module 104 is configured to cause the base station 14-1 to transmit one or more respective indicators of the one or more selected techniques for calculating CQI. Each indicator is a respective identifier, code, etc., in some embodiments. In an embodiment, selecting a technique for calculating CQI includes selecting a technique for calculating an interference covariance from a plurality of alternative techniques for calculating interference covariance, where the selected interference covariance is then used to calculate a CQI. In an embodiment, the CQI calculation technique selection module 104 is included in the PHY processing device 20. In an embodiment, the CQI calculation technique selection module 104 is included in the MAC processing device 18. In an embodiment, the CQI calculation technique selection module 104 is not included in either the PHY processing device 20 or the MAC processing device 18.

In an embodiment, the network interface 27 of the client station 25 includes a CQI calculation module 108 configured to calculate CQI according to the selected one or more techniques selected by the CQI calculation technique selection module 104 of the base station 14-1. For example, the CQI calculation module 104 processes the one or more respective indicators of the one or more selected techniques for calculating CQI transmitted by the base station 14-1, and uses the one or more respective indicators to determine the one or more techniques to utilize when calculating CQI. In an embodiment, the CQI calculation module 108 is configured to cause the client station 25 to transmit the one or more CQIs calculated according to the one or more selected techniques to the base station 14-1 and/or to other base stations 14.

In an embodiment, the CQI calculation module 108 is included in the PHY processing device 29. In an embodiment, the CQI calculation module 108 is included in the MAC processing device 28. In an embodiment, the CQI calculation module 108 is not included in either the PHY processing device 29 or the MAC processing device 28.

In an embodiment, the network interface 16 of the base station 14-1 includes a coordinated transmission module 112 configured (i) to process one or more CQIs calculated by the client station 25 and received from the client station 25, and (ii) to utilize the one or more CQIs to perform coordinated transmission. For example, the coordinated transmission module 112 uses the one or more CQIs to select a type of coordinated transmission to employ (e.g., JP, CB, DPS, etc.), in an embodiment. As another example, the coordinated transmission module 112 uses the one or more CQIs to determine which base stations 14 will participate in a coordinated transmission to the client station 25, in an embodiment. As yet another example, the coordinated transmission module 112 uses the one or more CQIs when performing pre-coding of signals to be transmitted to the client station 25, in an embodiment.

In some embodiments, the network interface 27 of the client station 25 calculates interference covariance for multiple different interference scenarios, and determines a set of one or more best interference covariance scenarios. For example, in an embodiment, the one or more best interference covariance scenarios correspond to a set of one or more interference hypotheses that result in higher spectral efficiency as compared to other interference hypotheses. The network interface 27 of the client station 25 causes a set of one or more CQIs corresponding to the set of one or more best interference covariance scenarios to be transmitted to one or more of the base stations 14 along with a set of one or more indicators of the one or more best interference covariance scenarios. In an embodiment, the network interface 16 of the base station 14 can determine how the CQI(s) in the set of one or more CQIs fed back from the client station 25 was generated using the set of one or more indicators and/or the interference hypothesis(es) to which the CQI(s) correspond.

Figure 1C:
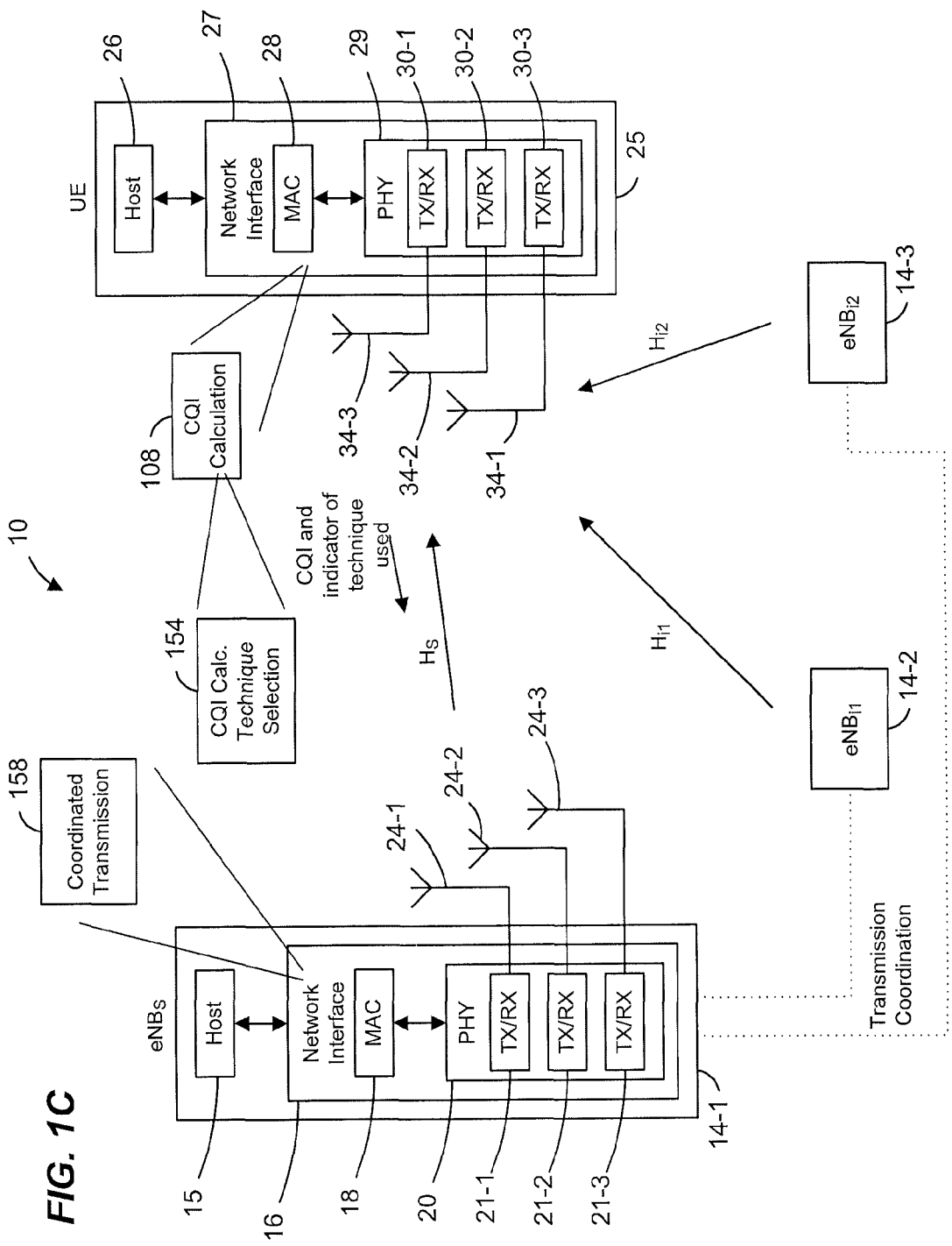
FIG. 1C is a block diagram of another example system in which a client station calculates a CQI which is then used by base stations to perform coordination transmission, according to an embodiment.

FIG. 1C is another block diagram of the example wireless communication network 10, according to another embodiment. Like-numbered are not discussed in detail for reasons of brevity. In an embodiment, the CQI calculation module 108 includes a CQI calculation technique selection module 154 configured to select a subset of one or more techniques for calculating CQI from a plurality of alternative techniques for calculating CQI. In an embodiment, selecting a technique for calculating CQI includes selecting a technique for calculating an interference covariance from a plurality of alternative techniques for calculating interference covariance, where the selected interference covariance is then used to calculate a CQI. Additionally, the CQI calculation technique selection module 104 is configured to cause the client station 25 to transmit one or more respective indicators of the one or more selected techniques for calculating CQI. Each indicator is a respective identifier, code, etc., in some embodiments.

In an embodiment, the network interface 16 of the base station 14-1 includes a coordinated transmission module 158 configured (i) to determine which technique(s) were utilized by the client station 25 to calculate one or more CQIs, (i) to process the one or more CQIs calculated by the client station 25 and received from the client station 25, and (iii) to utilize the one or more CQIs to perform coordinated transmission. For example, the coordinated transmission module 158 processes the one or more respective indicators of the one or more selected techniques for calculating CQI transmitted by the client station 25, and uses the one or more respective indicators to determine the one or more techniques utilized by the client station 25 when calculating CQI. As another example, the coordinated transmission module 112 uses the one or more CQIs and/or the determination of which technique(s) were utilized to select a type of coordinated transmission to employ (e.g., JP, CB, DPS, etc.), in an embodiment. As another example, the coordinated transmission module 112 uses the one or more CQIs and/or the determination of which technique(s) were utilized to determine which base stations 14 will participate in a coordinated transmission to the client station 25, in an embodiment. As yet another example, the coordinated transmission module 112 uses the one or more CQIs when performing pre-coding of signals to be transmitted to the client station 25, in an embodiment.

In some embodiments, to enable accurate interference measurement for future downlink transmissions (e.g., from one or more of the base stations 14 to the client station 25), the base station 14-1 (or a central controller not illustrated in FIGS. 1A and 1B) allocates certain REs where no signal is transmitted by the base stations 14-1, 14-2, and/or 14-3 that are to send a future desired signal to the client station 25, and such REs are sometimes referred to as interference measurement resources (IMRs). In an embodiment, dominant interferers for the client station 25 will transmit during the allocated IMRs and while the client station performs interference measurement. In an embodiment, the client station 25 accumulates these observations over frequency and time and calculates a covariance according to:

$$y(f, t) = \sum_{i \in I} H_i(f, t)x_i(f, t) + n(f, t) \quad \text{Equation 1}$$

where f is a frequency of an allocated RE, t is a time period corresponding to the allocated RE, I is a set of dominant interferers for the client station 25, $H_i$ is the channel from the i-th interferer to the client station 25, $x_i$ is a signal transmitted by the i-th interferer in the RE, n is interference and noise from outside a cluster of base stations 14, and y is a received observation made by the client station 25 in the allocated RE.

In an embodiment, the network interface 27 of the client station 25 is configured to compute an interference covariance according to:

$$K_1(f, t) = \sum_{\substack{m \in F(f) \\ n \in T(t)}} y(m, n)y^*(m, n) \quad \text{Equation 2}$$

where F(f) corresponds to a set of subchannels at which IMRs are located, and T(t) indicates a set of time periods at which the IMRs are located. Equation 2 corresponds to an assumption that none of the base stations 14 will act as interferers during the future transmission of the desired signal. This assumption, however, may not always be true and one or more of the base stations 14 may, in fact, cause interference to the client station 25.

In an embodiment, the network interface 27 of the client station 25 is additionally or alternatively configured to compute an interference covariance according to:

$$K_2(f, t) = \sum_{\substack{m \in F(f) \\ n \in T(t)}} y(m, n)y^*(m, n) + \sum_{k \notin TS} \hat{H}_k(f, t)\hat{H}_k^*(f, t) \quad \text{Equation 3}$$

where the second term of Equation 3 corresponds to channel estimates for base stations 14 that will not be included in a future coordinated transmission. Equation 3 corresponds to an assumption that one or more of the base stations 14 (corresponding to the second term of Equation 3) will act as interferers during the future transmission of the desired signal.

For a CSI reporting set of 2 base stations 14 and one IMR, the total number of interference covariance computations is 4, in an embodiment. For example, for a reporting set including base stations 14-1 and 14-2, a first covariance computation corresponds to Equation 2; a second covariance computation corresponds to Equation 3 and assumes that base station 14-1 is an interferer; a third covariance computation corresponds to Equation 3 and assumes that base station 14-2 is an interferer; and a fourth covariance computation corresponds to Equation 3 and assumes that both base station 14-1 and base station 14-2 are interferers.

Similarly, for a CSI reporting set of 3 base stations 14 and one IMR, the total number of ways to calculate interference covariance is 8, in an embodiment. In general, for a CSI reporting set of N base stations 14 and one IMR, the total number of ways to calculate interference covariance is $2^N$, in an embodiment. With M IMRs, the total number ways to calculate interference covariance is $M*2^N$, in an embodiment.

As can be seen, the number of ways to calculate CQI may become relatively high. If the client station 25 calculates CQI according to one technique but the base station 14-1 assumes that a different technique was used, a loss in performance may result. Thus, in some embodiments, the network interface 16 of the base station 14-1 is configured to select a set of one or more techniques for the client station 25 to calculate CQI, and to cause the base station 14-1 to transmit to the client station 25 an indication of the selected set. The network interface 27 of the client station 25 is configured to then calculate one or more CQIs according to the selected set, and to cause the client station 25 to feed back to the base station 14-1 the one or more calculated CQIs. On the other hand, in some embodiments, the network interface 27 of the client station 25 is configured to calculate interference covariance using a plurality of techniques, and to select a set of one or more best interference covariance results. The network interface 27 is configured to then calculate one or more CQIs according to the selected set, and to cause the client station 25 to feed back to the base station 14-1 the one or more calculated CQIs along with indications of which interference covariance calculation techniques were used to calculate the one or more CQIs.

In an embodiment, a CQI is calculated on a per-CSI-RS resource basis. For example, in an embodiment, for a particular CSI-RS$_i$, CQI is calculated assuming that all base stations 14 except the i-th base station are interferers. For example, in an embodiment, CQI for a particular CSI-RS$_i$ is calculated according to:

$$\text{feedback\_report}(CSIRS_i)=f(H_i,K_n(f,t)) \quad \text{Equation 4}$$

where f(H,K) is a suitable CQI calculation function with parameters $H_i$ and $K_n$, $H_i$ is the channel estimate corresponding to the channel from the i-th base station to the client station 25, $K_n$ is calculated according to Equation 2 or Equation 3. When $K_n$ is calculated according to Equation 3, it is assumed that all base stations 14 except the i-th base station are interferers, in an embodiment. This assumption is suitable for DPS transmission, in an embodiment. When $K_n$ is calculated according to Equation 2, it is assumed that none of the base stations 14 are interferers, in an embodiment. This assumption is suitable for CB transmission, in an embodiment.

In an embodiment, the network interface 16 of the base station 14-1 is configured to determine that the client station 25 should calculate CQI corresponding to the i-th CSI-RS according to Equation 4, and to cause the base station 14-1 to transmit to the client station 25 an indication of the selected technique for calculating CQI. The indication may also indicate whether Equation 2 or Equation 3 should be utilized. The network interface 27 of the client station 25 is configured to then calculate the corresponding CQI according to the Equation 4, and to cause the client station 25 to feed back to the base station 14-1 the calculated CQI. On the other hand, in some embodiments, the network interface 27 of the client station 25 is configured to calculate CQI according to Equation 4. The network interface 27 is configured to then cause the client station 25 to feed back to the base station 14-1 the calculated CQI along with an indication that the CQI was calculated according to Equation 4.

In an embodiment, an aggregated CQI is calculated for multiple CSI-RSs. An aggregated CQI is suitable for joint transmission, in an embodiment. For example, in an embodiment, for a particular set of two CSI-RSs (CSI-RS$_i$ and CSI-RS$_k$), CQI is calculated assuming that all base stations 14 except the i-th base station are interferers. For example, in an embodiment, CQI for a particular CSI-RS$_i$ is calculated according to:

$$\text{feedback\_report}(CSIRS_i,CSIRS_k)=g(H_i,H_k,K_n(f,t)) \quad \text{Equation 5}$$

where $g(H_i, H_k, K)$ is a suitable CQI calculation function, $H_i$ is the channel estimate corresponding to the channel from the i-th base station to the client station 25, $H_k$ is the channel estimate corresponding to the channel from the k-th base station to the client station 25, $K_n$ is calculated according to Equation 2 or Equation 3. Here the CSI-RSs i and k are aggregated and tied to the interference method n for CQI feedback. It is noted that Equation 5 can be modified in a straightforward manner to calculate CQI for an aggregation of three or more CSI-RSs. In general, with N CSI-RSs, $2^N-N-1$ combinations of aggregated CQI are available.

In an embodiment, the network interface 16 of the base station 14-1 is configured to determine that the client station 25 should calculate an aggregate CQI corresponding to multiple CSI-RSs according to Equation 5 or another suitable equation, and to cause the base station 14-1 to transmit to the client station 25 an indication (e.g., a known identifier, code, etc.) of the selected technique for calculating the aggregated CQI. The indication may also indicate whether Equation 2 or Equation 3 should be utilized. The network interface 27 of the client station 25 is configured to then calculate the corresponding aggregate CQI according to the Equation 5 (or another suitable equation), and to cause the client station 25 to feed back to the base station 14-1 the calculated aggregate CQI. On the other hand, in some embodiments, the network interface 27 of the client station 25 is configured to calculate aggregate CQI according to Equation 5 (or another suitable equation). The network interface 27 is configured to then cause the client station 25 to feed back to the base station 14-1 the calculated aggregate CQI along with an indication that the aggregate CQI was calculated according to Equation 5 (or some other suitable equation).

Figure 2:
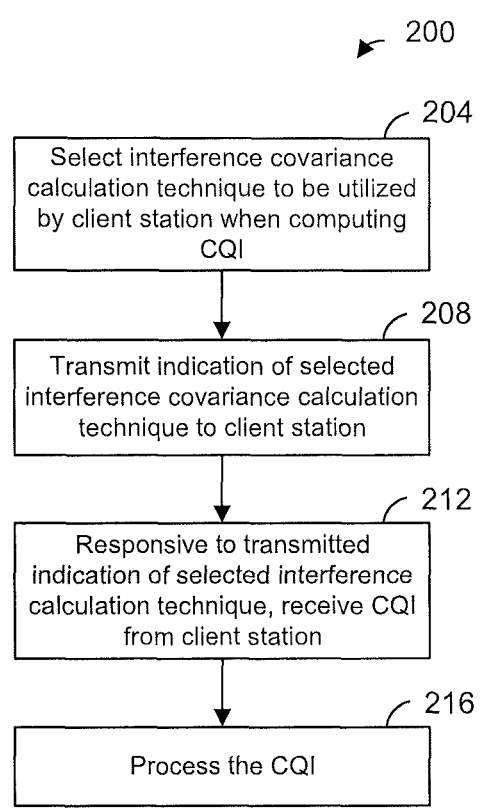
FIG. 2 is a flow diagram of an example method for prompting a client station to calculate a CQI, according to an embodiment.

FIG. 2 is a flow diagram of an example method 200 for prompting a client device to calculate CQI using a particular interference covariance calculation technique, according to an embodiment. The method 200 is implemented, at least partially, by the network interface 16 of the base station 14-1, in an embodiment. In other embodiments, the method 200 is implemented by another suitable communication device.

At block 204, an interference covariance calculation technique is selected from a set of multiple techniques for calculating interference covariance. The selected interference covariance calculation technique is to be utilized by a client station 25 when computing a channel quality indicator (CQI) associated with a communication channel between the base station 14-1 and the client station 25.

At block 208, an indication of the selected interference covariance calculation technique is transmitted to the client station 25.

At block 212, a CQI calculated by the client station 25 is received at the base station 14-1. The CQI received at block 212 is responsive to the indication transmitted at block 208, in an embodiment. The CQI received at block 212 has been calculated by the client station 25 in accordance with the selected interference covariance calculation technique, in an embodiment.

At block 216, the CQI received at block 212 is processed. In an embodiment, block 216 includes using the CQI to perform one or more of JP, CB, DPS, interference mitigation, etc.

Figure 3:
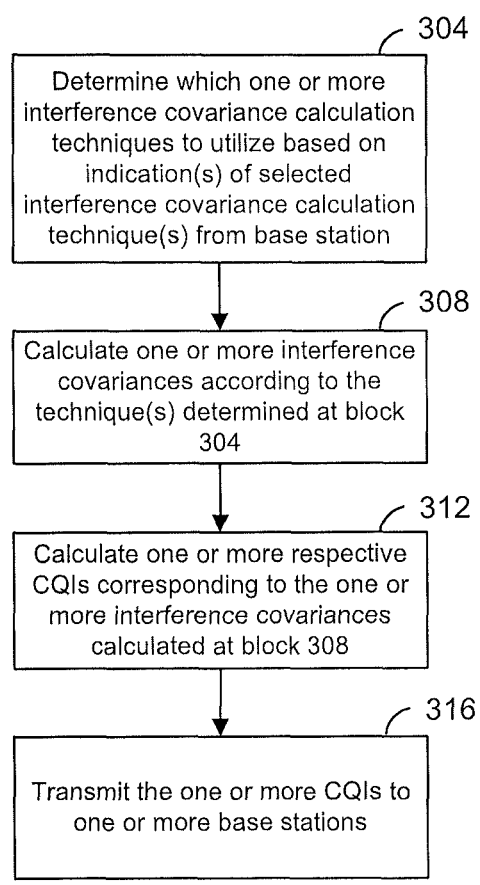
FIG. 3 is a flow diagram of an example method for calculating a CQI at a client station according to a technique selected by a base station, according to an embodiment.

FIG. 3 is a flow diagram of an example method 300 for calculating one or more CQIs using selected one or more interference covariance calculation techniques, according to an embodiment. The method 300 is implemented, at least partially, by the network interface 27 of the client station 25, in an embodiment. In other embodiments, the method 300 is implemented by another suitable communication device.

At block 304, it is determined which one or more interference covariance calculation techniques should be utilized. Determining which one or more interference covariance calculation techniques should be utilized includes analyzing one or more indications of selected techniques received from the base station 14-1, in an embodiment.

At block 308, one or more interference covariances are calculated according to the one or more techniques determined at block 304. At block 312, one or more respective CQIs are calculated using the one or more interference covariances calculated at block 308.

At block 316, the one or more CQIs calculated at block 312 are transmitted to the base station 14-1 and/or one or more other base stations 14.

Figure 4:
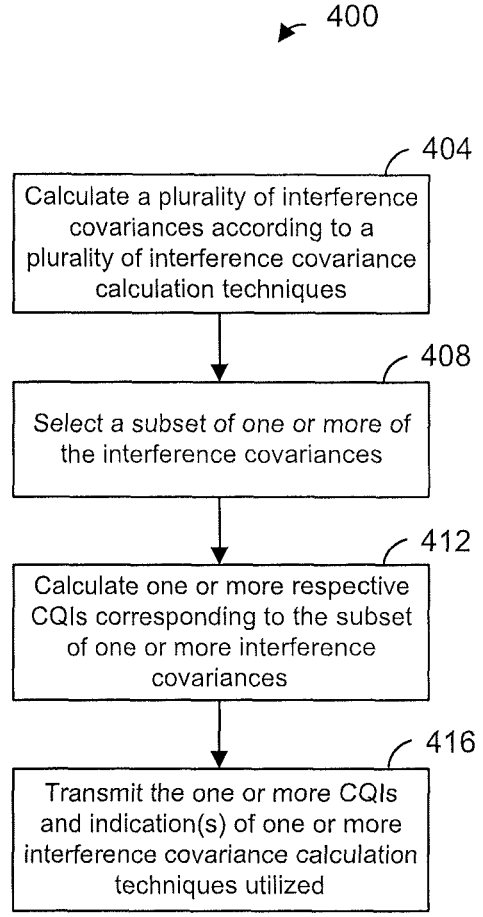
FIG. 4 is a flow diagram of an example method for calculating one or more CQIs at a client station, according to an embodiment.

FIG. 4 is a flow diagram of an example method 400 for calculating one or more CQIs using selected one or more interference covariance calculation techniques, according to an embodiment. The method 400 is implemented, at least partially, by the network interface 27 of the client station 25, in an embodiment. In other embodiments, the method 400 is implemented by another suitable communication device.

At block 404, a plurality of interference covariances are calculated according to a plurality of interference covariance calculation techniques.

At block 408, a subset of one or more interference covariances calculated at block 404 are selected. In an embodiment, a selected subset corresponds to one or more best interference covariance scenarios. For example, in an embodiment, the one or more best interference covariance scenarios correspond to a set of one or more interference hypotheses that result in higher spectral efficiency as compared to other interference hypotheses. In an embodiment, only one interference covariance scenario is selected at block 408, where the one selected interference scenario corresponds to an interference hypotheses that results in maximum spectral efficiency as compared to other interference hypotheses.

At block 412, one or more respective CQIs are calculated using the one or more interference covariances selected at block 408.

At block 416, the one or more CQIs calculated at block 412 are transmitted to the base station 14-1 (and/or one or more other base stations 14) along with one or more respective indications of one or more respective interference covariance calculation techniques utilized to calculate the one or more CQIs.

Figure 5:
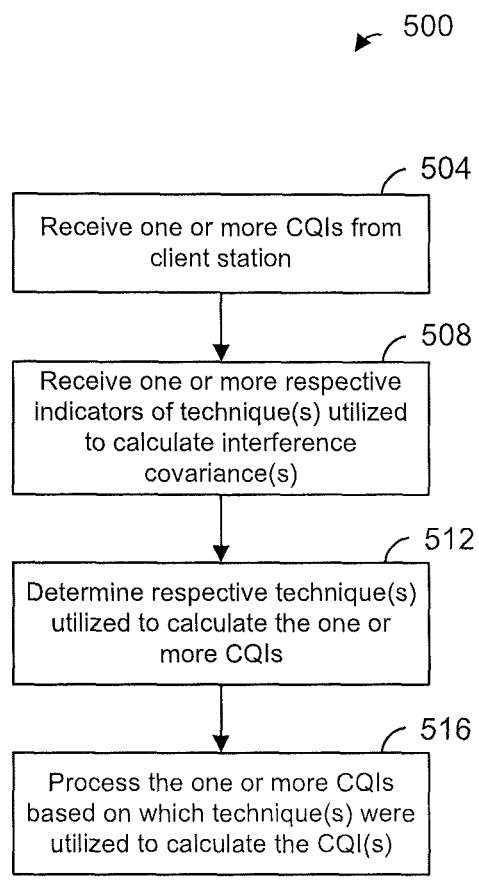
FIG. 5 is a flow diagram of an example method for processing, at a base station, one or more CQIs calculated by a client station, according to an embodiment.

FIG. 5 is a flow diagram of an example method 500 for processing CQI(s) and related information received from a client station. The method 500 is implemented, at least partially, by the network interface 16 of the base station 14-1, in an embodiment. In other embodiments, the method 500 is implemented by another suitable communication device.

At block 504, one or more CQIs calculated by the client station 25 are received at the base station 14-1.

At block 508, one or more respective indicators of one or more respective interference covariance calculation techniques utilized by the client station 25 to calculate the one or more CQIs are received at the base station 14-1.

At block 512, one or more interference covariance calculation techniques utilized by the client station 25 when computing the one or more CQIs are determined using the one or more respective indicators received at block 508.

At block 516, the one or more CQIs received at block 504 are processed based on the determination (at block 512) of the one or more interference covariance calculation techniques utilized by the client station 25 when computing the one or more CQIs. In an embodiment, block 516 includes using the CQI to perform one or more of JP, CB, DPS, interference mitigation, etc.

Further aspects of the disclosure relate to one or more of the following clauses.

In one embodiment, a method includes selecting, at a first communication device, an interference covariance calculation technique to be utilized by a second communication device when computing a channel quality indicator (CQI) associated with a communication channel between the first communication device and the second communication device, wherein the interference covariance calculation technique is selected from a set of multiple techniques for calculating interference covariance; transmitting, with the first communication device, an indication of the selected interference covariance calculation technique to the second communication device; and receiving, at a first communication device, a CQI calculated by the second communication device in accordance with the selected interference covariance calculation technique.

In other embodiments, the method includes any combination of one or more of the following features.

Selecting the interference covariance calculation technique comprises selecting, at the first communication device, an equation that is to be utilized by the second communication device when calculating interference covariance, the equation selected from a set of multiple equations.

The set of multiple equations includes a first equation that corresponds to no transmitters in a cluster being considered as interferers, and a second equation that corresponds to a set of one or more transmitters in the cluster being considered as interferers.

Selecting the interference covariance calculation technique comprises selecting, at the first communication device, a set of one or more transmitters that are to be considered interferers when calculating interference covariance.

The method further comprises selecting, at the first communication device, a CQI calculation technique to be utilized by the second communication device when computing the CQI associated with the communication channel between the first communication device and the second communication device, wherein the CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters; and transmitting, with the first communication device, an indication of the selected CQI calculation technique to the second communication device, wherein the received CQI calculated by the second communication device is in accordance with the selected CQI calculation technique.

In another embodiment, a first communication device comprises a network interface device. The network interface device is configured to select an interference covariance calculation technique to be utilized by a second communication device when computing a channel quality indicator (CQI) associated with a communication channel between the first communication device and the second communication device, wherein the interference covariance calculation technique is selected from a set of multiple techniques for calculating interference covariance, cause the first communication device to transmit an indication of the selected interference covariance calculation technique to the second communication device, and process a CQI received from the second communication device in response to the transmitted indication of the selected interference covariance calculation device, the CQI having been calculated by the second communication device in accordance with the selected interference covariance calculation technique.

In other embodiments, the first communication device comprises any combination of one or more of the following features.

The network interface device is configured to select interference covariance calculation technique at least by selecting an equation that is to be utilized by the second communication device when calculating interference covariance, the equation selected from a set of multiple equations.

The set of multiple equations includes a first equation that corresponds to no transmitters in a cluster being considered as interferers, and a second equation that corresponds to a set of one or more transmitters in the cluster being considered as interferers.

The network interface device is configured to select interference covariance calculation technique at least by selecting a set of one or more transmitters that are to be considered interferers when calculating interference covariance.

The network interface device is configured to select, a CQI calculation technique to be utilized by the second communication device when computing the CQI associated with the communication channel between the first communication device and the second communication device, wherein the CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters, and cause the first communication device to transmit an indication of the selected CQI calculation technique to the second communication device, wherein the received CQI calculated by the second communication device is in accordance with the selected CQI calculation technique.

In another embodiment, a method includes calculating, at a first communication device, a plurality of interference covariances according to a plurality of interference covariance calculation techniques, the plurality of interference covariances associated with a communication channel between the first communication device and a second communication device; selecting, at the first communication device, a subset of one or more interference covariances in the plurality of interference covariances; calculating, at the first communication device, a set of one or more respective channel quality indicators (CQIs) using the subset of one or more interference covariances; transmitting, from the first communication device to the second communication device, the set of one or more CQIs; and transmitting, from the first communication device to the second communication device, a set of one or more indicators of one or more respective interference covariance calculation techniques utilized to calculate the set of one or more CQIs.

In other embodiments, the method includes any combination of one or more of the following features.

The plurality of interference covariance calculation techniques comprises a first interference covariance calculation technique that utilizes a first equation that corresponds to no transmitters in a cluster being considered as interferers, and a second interference covariance calculation technique that utilizes a second equation that corresponds to a set of one or more transmitters in the cluster being considered as interferers.

The plurality of interference covariance calculation techniques comprises a first interference covariance calculation technique that considers a third communication device as an interferer; and a second interference covariance calculation technique that does not consider the third communication device as an interferer.

Calculating the set of one or more respective CQIs using the subset of one or more interference covariances comprises calculating the set of one or more CQIs according to a selected CQI calculation technique, wherein the selected CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters.

The method further comprises transmitting, from the first communication device to the second communication device, an indication of the selected CQI calculation technique.

Selecting the subset of one or more interference covariances in the plurality of interference covariances comprises selecting one or more interference covariances that correspond to one or more respective interference hypotheses that result in higher spectral efficiency as compared to other interference hypotheses corresponding to other interference covariances.

In another embodiment, a first communication device comprises a network interface device. The network interface device is configured to calculate a plurality of interference covariances according to a plurality of interference covariance calculation techniques, the plurality of interference covariances associated with a communication channel between the first communication device and a second communication device, select a subset of one or more interference covariances in the plurality of interference covariances, calculate a set of one or more respective channel quality indicators (CQIs) using the subset of one or more interference covariances, cause the first communication device to transmit the set of one or more CQIs to the second communication device, and cause the first communication device to transmit a set of one or more indicators of one or more respective interference covariance calculation techniques utilized to calculate the set of one or more CQIs to the second communication device.

In other embodiments, the first communication device comprises any combination of one or more of the following features.

The plurality of interference covariance calculation techniques comprises a first interference covariance calculation technique that utilizes a first equation that corresponds to no transmitters in a cluster being considered as interferers; and a second interference covariance calculation technique that utilizes a second equation that corresponds to a set of one or more transmitters in the cluster being considered as interferers.

The plurality of interference covariance calculation techniques comprises a first interference covariance calculation technique that considers a third communication device as an interferer; and a second interference covariance calculation technique that does not consider the third communication device as an interferer.

The network interface is configured to calculate the set of one or more respective CQIs at least by calculating the set of one or more CQIs according to a selected CQI calculation technique, wherein the selected CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters, and cause the first communication device to transmit an indication of the selected CQI calculation technique to the second communication device.

The network interface device is configured to select the subset of one or more interference covariances in the plurality of interference covariances at least by selecting one or more interference covariances that correspond to one or more respective interference hypotheses that result in higher spectral efficiency as compared to other interference hypotheses corresponding to other interference covariances.

The network interface device is configured to select the subset of one or more interference covariances in the plurality of interference covariances at least by selecting an interference covariance that correspond to a maximum spectral efficiency as compared to other interference hypotheses corresponding to other interference covariances.

In another embodiment, a method includes receiving, at a first communication device, an indication of a selected interference covariance calculation technique from a second communication device, the selected interference covariance calculation technique having been selected by the second communication device from a set of multiple techniques for calculating interference covariance; determining, at the first communication device, which interference covariance calculation technique from the set of multiple techniques for calculating interference covariance to use when calculating an interference covariance based on the received indication, the interference covariance associated with a communication channel between the first communication device and the second communication device; calculating, at the first communication device, the interference covariance using the determined interference covariance calculation technique; calculating, at the first communication device, a channel quality indicator (CQI) using the calculated interference covariance, the CQI associated with the communication channel between the first communication device and the second communication device; and transmitting, with the first communication device, the CQI to the second communication device.

In other embodiments, the method includes any combination of one or more of the following features.

Determining which interference covariance calculation technique to use comprises determining, at the first communication device, an equation that is to be utilized based on the received indication, the equation from a set of multiple alternative equations.

The set of multiple alternative equations includes: a first equation that corresponds to no transmitters in a cluster being considered as interferers, and a second equation that corresponds to a set of one or more transmitters in the cluster being considered as interferers.

Determining which interference covariance calculation technique to use comprises: determining, at the first communication device, a set of one or more transmitters that are to be considered interferers when calculating interference covariance.

The method further comprises receiving, with the first communication device, an indication of a selected CQI calculation technique to be utilized by the first communication device when computing the CQI, the CQI calculation technique having been selected by the second communication device from a set of multiple techniques for CQI including (i) a first CQI calculation technique associated with calculating CQI for a single transmitter, and (ii) a second CQI calculation technique associated with calculating an aggregated CQI for multiple transmitters, wherein calculating the CQI comprises calculating the CQI using the selected CQI calculation technique.

In another embodiment, a first communication device comprises a network interface device. The network interface device is configured to determine which interference covariance calculation technique from a set of multiple techniques for calculating interference covariance to use when calculating an interference covariance based on an indication of a selected interference covariance calculation technique received from a second communication device, the selected interference covariance calculation technique having been selected by the second communication device from a set of multiple techniques for calculating interference covariance, the interference covariance associated with a communication channel between the first communication device and the second communication device, calculate the interference covariance using the determined interference covariance calculation technique, calculate a channel quality indicator (CQI) using the calculated interference covariance, the CQI associated with the communication channel between the first communication device and the second communication device, and cause the first communication device to transmit the CQI to the second communication device.

In other embodiments, the first communication device comprises any combination of one or more of the following features.

The network interface device is configured to determine which interference covariance calculation technique to use at least by determining an equation that is to be utilized based on the received indication, the equation from a set of multiple alternative equations.

The set of multiple equations includes: a first equation that corresponds to no transmitters in a cluster being considered as interferers; and a second equation that corresponds to a set of one or more transmitters in the cluster being considered as interferers.

The network interface device is configured to determine which interference covariance calculation technique to use at least by determining a set of one or more transmitters that are to be considered interferers when calculating interference covariance.

The network interface device is configured to determine a CQI calculation technique to use based on a received indication of a selected CQI calculation technique, the selected CQI calculation technique having been selected by the second communication device from a set of multiple techniques for CQI calculation including (i) a first CQI calculation technique associated with calculating CQI for a single transmitter, and (ii) a second CQI calculation technique associated with calculating an aggregated CQI for multiple transmitters, calculate the CQI using the determined CQI calculation technique.

In another embodiment, a method includes receiving, at a first communication device, a channel quality indicator (CQI) transmitted from a second communication device, the CQI having been calculated by the second communication device, wherein the CQI is associated with a communication channel between the first communication device and the second communication device; receiving, at the first communication device, an indication of an interference covariance calculation technique transmitted from the second communication device, the interference covariance calculation technique having been utilized by the second communication device to compute the CQI; determining, at the first communication device, which interference covariance calculation technique, from a plurality of alternative interference covariance calculation techniques, was utilized by the second communication device based on the received indication of the interference covariance calculation technique; and processing, at the first communication device, the CQI based on the determination of the interference covariance calculation technique utilized by the second communication device.

In other embodiments, the method includes any combination of one or more of the following features.

Determining which interference covariance calculation technique was utilized comprises determining which equation, from a set of multiple alternative equations, was utilized by the second communication device.

The set of multiple alternative equations includes: a first equation that corresponds to no transmitters in a cluster being considered as interferers, and a second equation that corresponds to a set of one or more transmitters in the cluster being considered as interferers.

Determining which interference covariance calculation technique was utilized comprises determining, at the first communication device, a set of one or more transmitters that are to be considered interferers when calculating interference covariance.

In another embodiment, a first communication device comprises a network interface device. The network interface device is configured to receive a channel quality indicator (CQI) transmitted from a second communication device, the CQI having been calculated by the second communication device, wherein the CQI is associated with a communication channel between the first communication device and the second communication device, receive an indication of an interference covariance calculation technique transmitted from the second communication device, the interference covariance calculation technique having been utilized by the second communication device to compute the CQI, determine which interference covariance calculation technique, from a plurality of alternative interference covariance calculation techniques, was utilized by the second communication device based on the received indication of the interference covariance calculation technique, and process the CQI based on the determination of the interference covariance calculation technique utilized by the second communication device.

In other embodiments, the first communication device any combination of one or more of the following features.

The network interface device is configured to determine which interference covariance calculation technique was utilized at least by determining which equation, from a set of multiple alternative equations, was utilized by the second communication device.

The set of multiple alternative equations includes: a first equation that corresponds to no transmitters in a cluster being considered as interferers; and a second equation that corresponds to a set of one or more transmitters in the cluster being considered as interferers.

The network interface device is configured to determine which interference covariance calculation technique was utilized at least by determining a set of one or more transmitters that are to be considered interferers when calculating interference covariance.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a random access memory, a read only memory, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A method, comprising:
    calculating, at a first communication device, a plurality of interference covariances according to a plurality of interference covariance calculation techniques, the plurality of interference covariances associated with a communication channel between the first communication device and a second communication device, wherein the plurality of interference covariance calculation techniques includes i) a first interference covariance calculation technique in which no transmitters in a cluster are considered as interferers, and ii) a second interference covariance calculation technique in which a set of one or more transmitters in the cluster are considered as interferers;
    selecting, at the first communication device, a subset of one or more interference covariances in the plurality of interference covariances;
    calculating, at the first communication device, a set of one or more respective channel quality indicators (CQIs) using the subset of one or more interference covariances;
    transmitting, from the first communication device to the second communication device, the set of one or more CQIs; and
    transmitting, from the first communication device to the second communication device, a set of one or more indicators of one or more respective interference covariance calculation techniques utilized to calculate the set of one or more CQIs.

2. The method of claim 1, wherein:
    the first interference covariance calculation technique utilizes a first equation that corresponds to no transmitters in the cluster being considered as interferers; and
    the second interference covariance calculation technique utilizes a second equation that corresponds to the set of one or more transmitters in the cluster being considered as interferers.

3. The method of claim 1, wherein:
    the second interference covariance calculation technique considers a third communication device as an interferer; and
    the first interference covariance calculation technique does not consider the third communication device as an interferer.

4. The method of claim 1, wherein:
    calculating the set of one or more respective CQIs using the subset of one or more interference covariances comprises calculating the set of one or more CQIs according to a selected CQI calculation technique, wherein the selected CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters; and the method further comprises transmitting, from the first communication device to the second communication device, an indication of the selected CQI calculation technique.

5. The method of claim 1, wherein selecting the subset of one or more interference covariances in the plurality of interference covariances comprises selecting one or more interference covariances that correspond to one or more respective interference hypotheses that result in higher spectral efficiency as compared to other interference hypotheses corresponding to other interference covariances.

6. A first communication device, comprising:
a network interface device having one or more integrated circuit devices configured to
calculate a plurality of interference covariances according to a plurality of interference covariance calculation techniques, the plurality of interference covariances associated with a communication channel between the first communication device and a second communication device, wherein the plurality of interference covariance calculation techniques includes i) a first interference covariance calculation technique in which no transmitters in a cluster are considered as interferers, and ii) a second interference covariance calculation technique in which a set of one or more transmitters in the cluster are considered as interferers,
select a subset of one or more interference covariances in the plurality of interference covariances,
calculate a set of one or more respective channel quality indicators (CQIs) using the subset of one or more interference covariances,
cause the first communication device to transmit the set of one or more CQIs to the second communication device, and
cause the first communication device to transmit a set of one or more indicators of one or more respective interference covariance calculation techniques utilized to calculate the set of one or more CQIs to the second communication device.

7. The first communication device of claim 6, wherein:
the first interference covariance calculation technique utilizes a first equation that corresponds to no transmitters in the cluster being considered as interferers; and
the second interference covariance calculation technique utilizes a second equation that corresponds to the set of one or more transmitters in the cluster being considered as interferers.

8. The first communication device of claim 6, wherein:
the second interference covariance calculation technique considers a third communication device as an interferer; and
the first interference covariance calculation technique does not consider the third communication device as an interferer.

9. The first communication device of claim 6, wherein the one or more integrated circuit devices are configured to:
calculate the set of one or more respective CQIs at least by calculating the set of one or more CQIs according to a selected CQI calculation technique, wherein the selected CQI calculation technique is selected from a set of multiple techniques for CQI including (i) a first CQI calculation technique associated with calculating CQI for a single transmitter, and (ii) a second CQI calculation technique associated with calculating an aggregated CQI for multiple transmitters, and cause the first communication device to transmit an indication of the selected CQI calculation technique to the second communication device.

10. The first communication device of claim 6, wherein the one or more integrated circuit devices are configured to select the subset of one or more interference covariances in the plurality of interference covariances at least by selecting one or more interference covariances that correspond to one or more respective interference hypotheses that result in higher spectral efficiency as compared to other interference hypotheses corresponding to other interference covariances.

11. The first communication device of claim 6, wherein the one or more integrated circuit devices are configured to select the subset of one or more interference covariances in the plurality of interference covariances at least by selecting an interference covariance that correspond to a maximum spectral efficiency as compared to other interference hypotheses corresponding to other interference covariances.

12. A method, comprising:
receiving, at a first communication device, an indication of a selected interference covariance calculation technique from a second communication device, the selected interference covariance calculation technique having been selected by the second communication device from a set of multiple techniques for calculating interference covariance, wherein the set of multiple techniques for calculating interference covariance includes i) a first interference covariance calculation technique in which no transmitters in a cluster are considered as interferers, and ii) a second interference covariance calculation technique in which a set of one or more transmitters in the cluster are considered as interferers;
determining, at the first communication device, which interference covariance calculation technique from the set of multiple techniques for calculating interference covariance to use when calculating an interference covariance based on the received indication, the interference covariance associated with a communication channel between the first communication device and the second communication device;
calculating, at the first communication device, the interference covariance using the determined interference covariance calculation technique;
calculating, at the first communication device, a channel quality indicator (CQI) using the calculated interference covariance, the CQI associated with the communication channel between the first communication device and the second communication device; and
transmitting, with the first communication device, the CQI to the second communication device.

13. The method of claim 12, wherein determining which interference covariance calculation technique to use comprises:
determining, at the first communication device, an equation that is to be utilized based on the received indication, the equation from a set of multiple alternative equations.

14. The method of claim 13, wherein the set of multiple alternative equations includes:
a first equation that corresponds to no transmitters in a cluster being considered as interferers, and
a second equation that corresponds to a set of one or more transmitters in the cluster being considered as interferers.

15. The method of claim 12, wherein determining which interference covariance calculation technique to use comprises:

determining, at the first communication device, a set of one or more transmitters that are to be considered interferers when calculating interference covariance.

16. The method of claim 12, further comprising:
receiving, with the first communication device, an indication of a selected CQI calculation technique to be utilized by the first communication device when computing the CQI, the CQI calculation technique having been selected by the second communication device from a set of multiple techniques for CQI including(i) a first CQI calculation technique associated with calculating CQI for a single transmitter, and (ii) a second CQI calculation technique associated with calculating an aggregated CQI for multiple transmitters,
wherein calculating the CQI comprises calculating the CQI using the selected CQI calculation technique.

17. A first communication device, comprising:
a network interface device having one or more integrated circuit devices configured to
determine which interference covariance calculation technique from a set of multiple techniques for calculating interference covariance to use when calculating an interference covariance based on an indication of a selected interference covariance calculation technique received from a second communication device, the selected interference covariance calculation technique having been selected by the second communication device from a set of multiple techniques for calculating interference covariance, the interference covariance associated with a communication channel between the first communication device and the second communication device, wherein the set of multiple techniques for calculating interference covariance includes i) a first interference covariance calculation technique in which no transmitters in a cluster are considered as interferers, and ii) a second interference covariance calculation technique in which a set of one or more transmitters in the cluster are considered as interferers,
calculate the interference covariance using the determined interference covariance calculation technique,
calculate a channel quality indicator (CQI) using the calculated interference covariance, the CQI associated with the communication channel between the first communication device and the second communication device, and
cause the first communication device to transmit the CQI to the second communication device.

18. The first communication device of claim 17, wherein the one or more integrated circuit devices are configured to determine which interference covariance calculation technique to use at least by determining an equation that is to be utilized based on the received indication, the equation from a set of multiple alternative equations.

19. The first communication device of claim 18, wherein the set of multiple equations includes:
a first equation that corresponds to no transmitters in a cluster being considered as interferers; and
a second equation that corresponds to a set of one or more transmitters in the cluster being considered as interferers.

20. The first communication device of claim 17, wherein the one or more integrated circuit devices are configured to determine which interference covariance calculation technique to use at least by determining a set of one or more transmitters that are to be considered interferers when calculating interference covariance.

21. The first communication device of claim 17, wherein the one or more integrated circuit devices are configured to:
determine a CQI calculation technique to use based on a received indication of a selected CQI calculation technique, the selected CQI calculation technique having been selected by the second communication device from a set of multiple techniques for CQI calculation including (i) a first CQI calculation technique associated with calculating CQI for a single transmitter, and (ii) a second CQI calculation technique associated with calculating an aggregated CQI for multiple transmitters,
calculate the CQI using the determined CQI calculation technique.

* * * * *